United States Patent
Wang et al.

(10) Patent No.: US 8,472,717 B2
(45) Date of Patent: Jun. 25, 2013

(54) FOREGROUND IMAGE SEPARATION METHOD

(75) Inventors: Wen-Hao Wang, Hsinchu (TW); Tai-Hui Huang, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 577 days.

(21) Appl. No.: 12/651,376

(22) Filed: Dec. 31, 2009

(65) Prior Publication Data

US 2011/0038535 A1 Feb. 17, 2011

(30) Foreign Application Priority Data

Aug. 14, 2009 (TW) .............................. 98127358 A (51) Int. Cl.
*G06K 9/34* (2006.01)

(52) U.S. Cl.
USPC .......................................... 382/173; 348/143

(58) Field of Classification Search
USPC ............................ 382/173–176; 348/143, 146
See application file for complete search history.

(56) References Cited

U.S. PATENT DOCUMENTS

| | | | |
|---|---|---|---|
| 5,847,755 A * | 12/1998 | Wixson et al. | 348/149 |
| 6,037,976 A * | 3/2000 | Wixson | 348/122 |
| 6,094,220 A | 7/2000 | Nakano et al. | |
| 6,434,254 B1 * | 8/2002 | Wixson | 382/103 |
| 7,006,128 B2 | 2/2006 | Xie et al. | |
| 7,136,525 B1 | 11/2006 | Toyama et al. | |
| 7,970,229 B2 * | 6/2011 | Connell | 382/254 |
| 2007/0047834 A1 | 3/2007 | Connell | |
| 2008/0095408 A1 * | 4/2008 | Yokohata et al. | 382/106 |
| 2010/0328486 A1 * | 12/2010 | Steinberg et al. | 348/222.1 |

OTHER PUBLICATIONS

Chris Stauffer et al, "Adaptive Background Mixture Models for Real-Time Tracking," Computer Vision and Pattern Recognition, Jun. 1999, 7 pages, vol. 2, IEEE, US.
Hui-Chi Zeng et al, "Adaptive Foreground Object Extraction for Real-Time Video Surveillance with Lighting Variations," Acoustic, Speech and Signal Processing, Apr. 2007, vol. 1, pp. 1201-1204, IEEE, US.
F. Gasparini et al, "Color Correction for Digital Photographs," Image Analysis and Processing, Sep. 2003, pp. 646-651, IEEE, Italy.
Edmund Y. Lam, "Combining Gray World and Retinex Theory for Automatic White Balance in Digital Photography," Proceedings of the Ninth International Symposium on Consumer Electronics, Jun. 2005, pp. 134-139, IEEE, Macau.
C.H. Chen et al, "Hardware-Software Co-Design of an Automatic White Balance," Dec. 2006, pp. 101-114, Taiwan.

(Continued)

*Primary Examiner* — Jingge Wu (57) ABSTRACT

A foreground image separation method is disclosed to separate dynamic foreground and static background in a sequence of input images which have been processed either with automatic white balance or brightness control by the camera. First, an input image is received from the camera, and then a white balance or brightness compensation is performed to the input image according to a reference image to generate a compensated image with background color and background brightness which are approximately similar to that of the reference image. Finally, a background subtraction algorithm is performed to the compensated image to generate a background separation result. The background subtraction algorithm could be a Gaussian Mixture Model based algorithm. The method could process successive images received from the camera to continuously generate background separation results and update the reference image accordingly, such that video surveillance system could adapt to the change of illumination.

14 Claims, 6 Drawing Sheets

OTHER PUBLICATIONS

Kentaro Toyama et al, "Wallflower: Principles and Practice of Background Maintenance," International Conference on Computer Vision, Sep. 1999, pp. 255-261, IEEE, Greece.

Philippe Noriega et al, "Real Time Illumination Invariant Background Subtraction Using Local Kernel Histograms," BMVC 2006, Sep. 2006, pp. 1-16, UK.

Binglong Xie et al, "Sudden Illumination Change Detection Using Order Consistency," 2003, Image and Vision Computing, Sep. 2003, pp. 117-125, Elsevier B.V., US.

Taiwan Patent Office, Office Action, Patent Application Serial No. 098127358, Aug. 22, 2012, Taiwan.

\* cited by examiner

FIG. 5

FOREGROUND IMAGE SEPARATION METHOD

CROSS-REFERENCE STATEMENT

This Application claims priority of Taiwan Patent Application No. 098127358, filed on Aug. 14, 2009, the entirety of which is incorporated by reference herein.

BACKGROUND

1. Technical Field

The disclosure relates generally to video surveillance system, and, more particularly to foreground image separation techniques without suffering from variation caused by illumination.

2. Background

In order to maintain public security and increase crime detection rate, surveillance cameras that have been widely placed in various public spaces have been utilized to collect evidences all-weather 24 hours as a necessary measurement in modern community. However, as the amount of the collected image becomes large, utilizing only a small number of security people may not sufficient to deal with actual demand. Therefore, using apparatuses to preliminary filter the surveillance video to reduce searching range for human inspection has become a major trend in automatic video surveillance system design.

Figure 1:
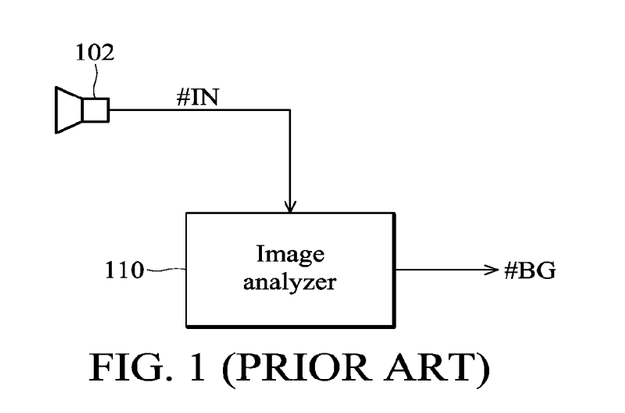
FIG. 1 is a schematic diagram illustrating a conventional video surveillance system architecture.

FIG. 1 is a schematic diagram illustrating a conventional video processing system. Major functional modules of the video processing system are a camera 102 in the front end and an image analyzer 110 in the back end. Based on all-weather monitoring requirement, the camera 102 in the front end is designed to have the ability of automatic white balance or exposure control function. Some problems may happen when the image analyzer 110 performs a foreground image separation due to those automatic adjustment functions. Therefore, how to improve reliability of the video monitor system under different illumination conditions becomes a hot topic to be solved in the art and it is a motivation of this application as well.

The automatic white balance function of the camera 102 may improve quality of captured image under different illumination conditions, however, the automatic adjustment mechanisms may be activated by foreground object color such that color tones of background image change immediately, thereby affecting the foreground image separation performance. In most monitor systems, the camera 102 in the front end and the image analyzer 110 in the back end are normally two independent systems and the camera 102 in the front end will not transmit those parameter information of automatic adjustment to the image analyzer 110 that performs image processing in the back end so that the image analyzer 110 must estimate values of the adjustment parameters itself to fix aforementioned problems. In some studies, using image texture features, such as image edges or local binary pattern, in the foreground separation could overcome the issue caused by the automatic white balance in a certain level. However, the foreground separation result may become poor under some specific conditions if only image texture feature is utilized, since there are some complementary properties between the texture and the color parameters.

SUMMARY

A method for correcting automatic white balance or exposure control is provided to ensure stable color and brightness of image in the background region so as to perform a correct foreground image separation by using a background subtraction algorithm.

In an embodiment of a foreground separation method of the application, an input image is first received from the camera. Thereafter, a white balance or lightness compensation is performed to the input image according to a reference image to generate a compensated image with background color and background brightness which are similar to that of the reference image. Finally, a background subtraction algorithm is performed to the compensated image to generate a background separation result. The camera could continuously generate input images and the white balance or brightness compensation is also continuously performed. The background subtraction algorithm could be a Gaussian Mixture Model based algorithm.

BRIEF DESCRIPTION OF THE DRAWINGS

The application will become more fully understood by referring to the following detailed description with reference to the accompanying drawings, wherein.

DETAILED DESCRIPTION OF DISCLOSED EMBODIMENT

Figure 2:
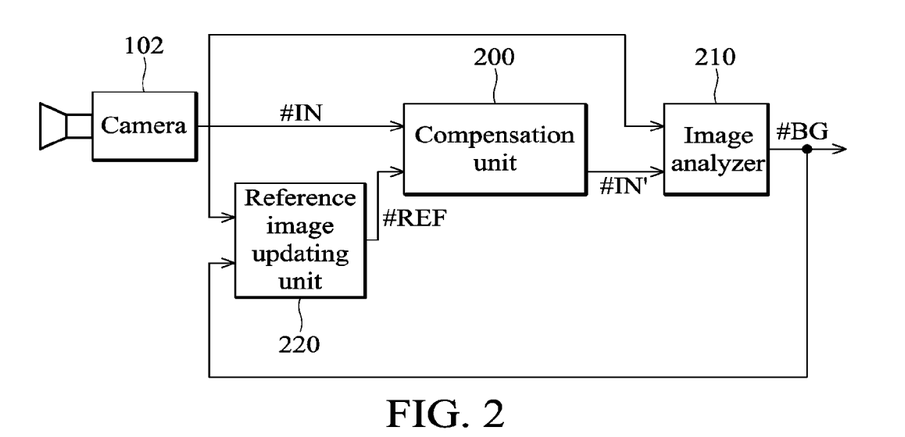
FIG. 2 is a schematic diagram illustrating an embodiment of an image monitor system of the application.

FIG. 2 is a schematic diagram illustrating an embodiment of a video surveillance system of the application. A camera 102 continuously captures images in the front end. Dynamic objects with different colors and brightness enter into a field of view of the camera 102 and may activate the automatic white balance or exposure control of the camera 102 to maintain a good imaging quality. When the automatic white balance or exposure control is activated by the presence of dynamic objects in an input image #IN captured by the camera 102, background color and brightness in the captured image may diverge from its original values. Such difference may cause that a conventional image analyzer 110 could not separate foreground and background correctly. Therefore, in embodiments of the application, a compensation unit 120 coupled to the output end of the camera 102 is provided to calibrate background color and brightness shift caused by the camera 102.

Generally, the camera 102 continuously captures images and may generate ten to thirty or more input images per second depending on different application requirement. The compensation unit 200 of the application may further continuously perform a color gain compensation step. Compensation step of the color gain comprises white balance and brightness adjustment. Embodiments of the application provide a reference image #REF to be a compensation basis of the white balance and the brightness. How to generate and update the reference image #REF will be discussed more detailed in the following. The compensation unit 200 performs the color gain compensation step to the input image #IN according to the reference image #REF to generate a compensated image #IN' with background color and brightness which are similar to those of the reference image #REF. By doing so, a subsequent image analyzer 210 may then perform a background subtraction algorithm to the compensated image #IN' to correctly separate foreground and background portions without suffering from effects caused by the white balance and brightness shift. Generally, a number of algorithms are currently used to separate foreground and background. For example, the image analyzer 210 may perform a Gaussian Mixture Model based algorithm and the background separation result #BG generated thereby will be represented by the foreground object picture or by the background mask. The principle of the background subtraction using Gaussian Mixture Model, in one word, is to utilize the Gaussian Mixture Models as a statistical representation of static background image and thereby a background separation result could be obtained based on the decision of foreground or background for each pixel in the input image.

The reference image #REF is basically taken from the input image sequence. More particularly, the physical meaning of the reference image #REF is essentially a static background picture with few dynamic objects. For example, to adapt the sunlight variation in day, the reference image updating unit 220 takes an input image #IN as a new updated reference image whenever the ratio of pixel numbers of foreground to whole image size in the background separation result #BG of the input image #IN is smaller than a predefined threshold.

Figure 3:
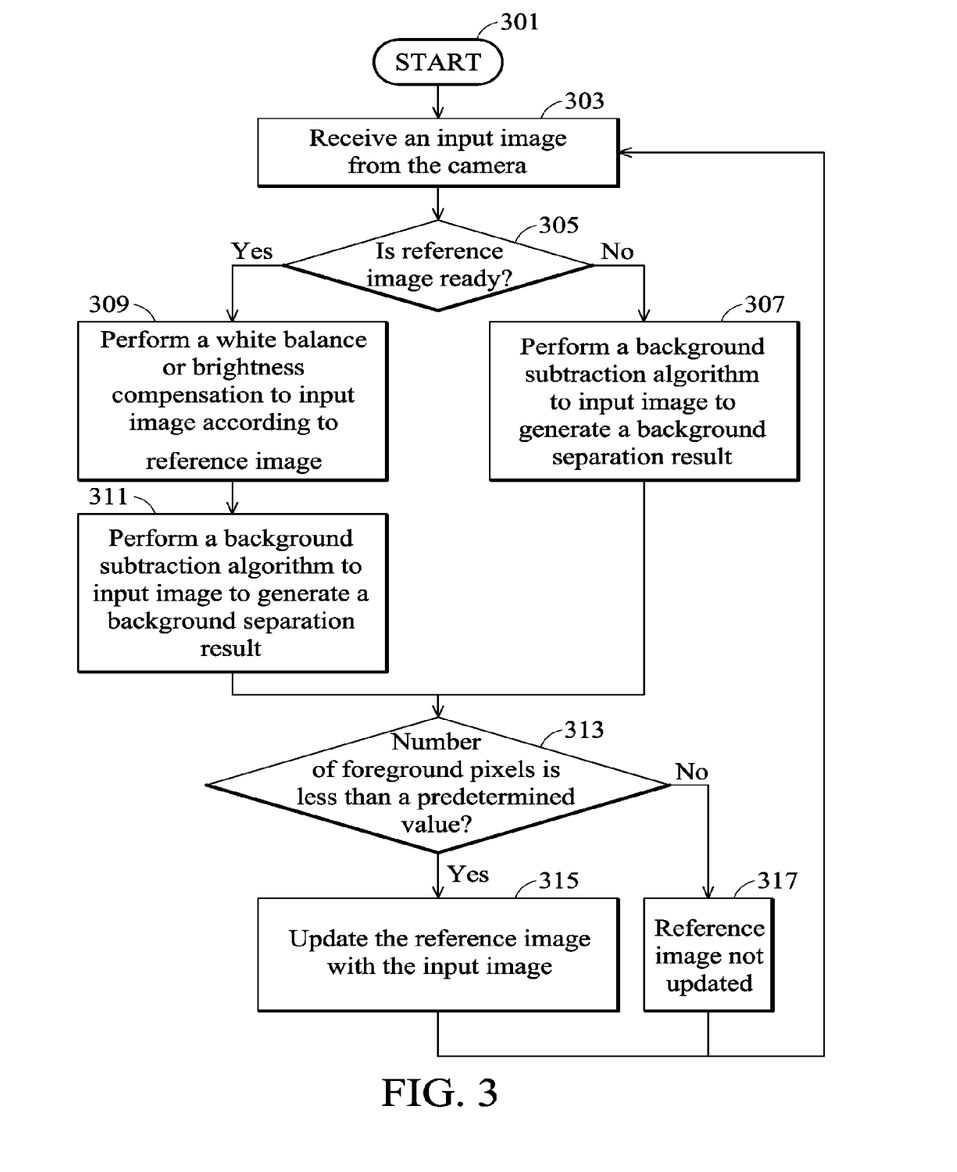
FIG. 3 is a flowchart of an embodiment of a foreground image separation method of the application.

FIG. 3 is a flowchart of an embodiment of a foreground separation method of the application. The monitor system shown in FIG. 2 is started in step 301. First, in step 303, the system starts to receive the input image #IN from the camera 102. In step 305, the compensation unit 200 checks whether the reference image #REF that is a basis of the white balance compensation operation of the application is ready or not. If the reference image #REF is ready, step 309 is performed by using the compensation unit 200 to generate a color and brightness compensated image #IN'. In the operation of step 309, the system receives an input image #IN from the camera 102 and performs a white balance or brightness compensation to the input image #IN according to the reference image #REF to generate a compensated image IN' with a background color and brightness which are similar to that of the reference image in correspondent region. Next, in step 311, the image analyzer 210 performs a background subtraction algorithm to the compensated image #IN' to generate a background separation result #BG. On the other hand, if the check result in step 305 shows that a reference image #REF is not ready, step 307 is then performed in which the image analyzer 210 directly performs a background subtraction algorithm to the input image #IN to generate a background separation result #BG without utilizing the compensation unit 200. After the background separation result #BG is generated based on different sources either in step 307 or 311, step 313 is performed in which the reference image updating unit 220 determines a ratio that pixels belonging to the foreground occupied on the input image #IN according to the background separation result #BG. If the ratio of number of the foreground pixels to whole image size is less than a predetermined value, step 315 is performed in which the reference image updating unit 220 will update the reference image #REF with the input image #IN. Alternatively, if the ratio of number of the foreground pixels to whole image size is greater than the predetermined value, step 317 is performed in which the reference image #REF will not be updated. After step 315 or 317 is completed, the flow recursively performs step 303 to continuously receive and compensate next input image and update the reference image accordingly.

Figure 4A:
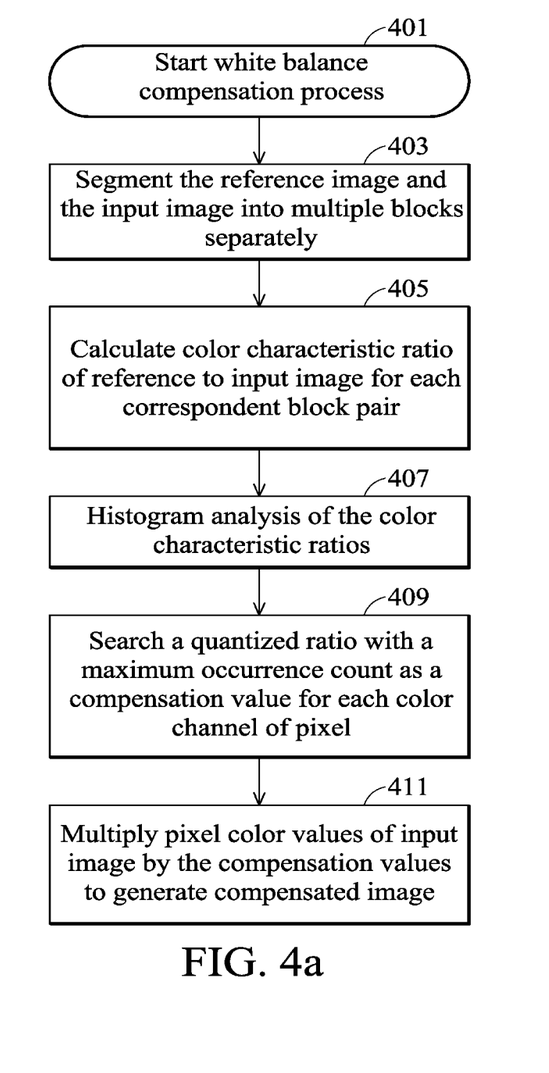
FIG. 4a is a flowchart of an embodiment of a method for white balance compensation of the application.

FIG. 4a is a flowchart of an embodiment of a method for white balance compensation of the application. Description of the process performed in the compensation unit 200 may be accompanied with FIGS. 4b to 4d. In step 401, the compensation unit 200 is first activated and starts to receive the input image #IN. In step 403, the compensation unit 200 separately segments the input image #IN and the reference image #REF into blocks with same size and same amount in which each block of the input image #IN has a one-to-one position relationship to a corresponding one of the blocks of the reference image #REF. For example, the reference image 410 shown in FIG. 4b has been segmented into 3×3 blocks in which $u^{ref}(x,y)$ represents an image block which is positioned at the coordinate (x,y) in the block space of reference image. Each of the blocks comprises multiple pixels and pixel color values of the pixels could be utilized to calculate characteristic values of the block including red, green and blue characteristic values $(r_1, g_1, b_1)$. Similarly, an input image 420 shown in FIG. 4c has also been divided into 3×3 blocks in which $u^r(x,y)$ represents an image block which is positioned at the coordinate (x,y) in the block space of input image 420 and red, green and blue characteristic values included therein are represented as $(r_2, g_2, b_2)$.

The characteristic values of the blocks could be calculated by various ways. One of which is to calculate an average value of all of the pixel color values within each of the blocks. For example, the red, green and blue characteristic values of a specific region may be the average values of all of the red pixel values, the green pixel values and the blue pixel values respectively. The other way is to use the maximum value to represent the characteristic value. For example, the red, green and blue characteristic values of a specific region may be the maximum values among all of the red pixel values, all of the green pixel values and all of the blue pixel values respectively. In another example, the aforementioned red, green and blue characteristic values could be multiplied by predetermined weighting values respectively and then be combined into a grayscale brightness which is taken as the grayscale brightness value as the characteristic value of the block. It is to be noted that calculation methods of the grayscale brightness value are well-known in the art and thus detail description is omitted here. Various ways for representing the characteristic values may be applied in the application, but basically the characteristic values could be calculated according to red, green and blue color values.

Figure 4B:
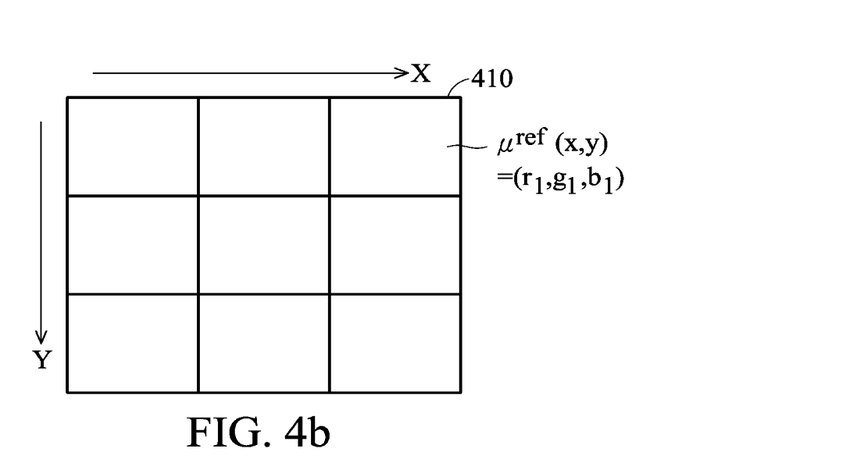
FIGS. 4b and 4c are diagrams illustrating embodiments of dividing the input image and the reference image into blocks for characteristic comparisons of the application.
Figure 4C:
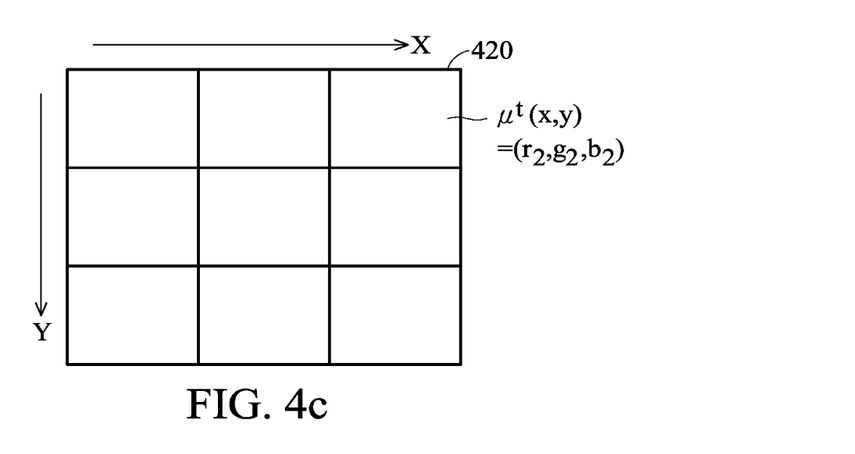

After the characteristic values of each block in the reference image 410 and in the input image 420 are obtained, step 405 is further performed. The characteristic value of each block in the reference image 410 will be divided by the characteristic value of a corresponding block in the input image 420 to obtain multiple ratios. In other words, color characteristic ratio of the reference image 410 to the input image 420 for each correspondent block pair will be calculated. As an example, a block $u^{ref}(x,y)$ in the reference image 410 and a corresponding block $u^r(x,y)$ in the input image 420 may be utilized to obtain a red color ratio $(r_1/r_2)$, a green color ratio $(g_1/g_2)$ and a blue color ratio $(b_1/b_2)$. In this embodiment, total nine blocks are utilized to obtain nine sets of red color ratio, the green color ratio and the blue color ratio.

In step 407, the compensation unit 200 performs a distribution analysis of those red color, green color and blue color ratios and generates a red compensation value, a green compensation value and a blue compensation value respectively. The distribution analysis may refer to FIG. 4d, in which a histogram is utilized. When performing the distribution analysis of those ratios, the compensation unit 200 divides those ratios by a quantization width into multiple quantization values which could be encoded by indices $C_1$ to $C_N$ (N is a nature number) to generate a histogram for counting occurrence number of quantized values. The quantization width is predefined and could be set with a value between 0.01 and 0.05.

Figure 4D:
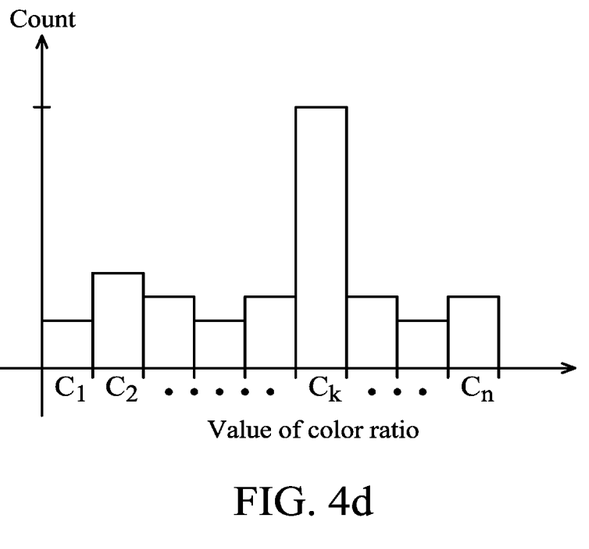
FIG. 4d is a diagram illustrating an embodiment of histogram analysis.

Then, in step 409, the compensation unit 200 selects a value that corresponds to a quantization index with the highest occurrence number of samples in the histogram to be the quantized color compensation value. For example, in FIG. 4d, the quantization index $C_K$ which is with the greatest occurrence number of quantized value, is selected as an estimate of the compensation value. Thus, it is inferred that although a small portion of pictures in the reference image 410 may be different from that in the input image 420 due to the presence of foreground objects, pixel color values at the most portion of background region in the input image are biased by a similar ratio with respect to that of the reference image. The value represented by the quantization index $C_K$ as shown in FIG. 4d, therefore, is with the highest probability to be the bias ratio. After the bias ratio is obtained, pixel color values of whole input image 420 are multiplied with the bias ratio for the color compensation.

Based on the principle as stated in the above paragraph, in step 411, the compensation unit 200 will multiply all of the pixel color values in the input image 420 by the compensation values determined by step 409 so as to generate the compensated image #IN'.

It is to be understood that the aforementioned image segmentation with 3×3 blocks is only for the simplicity of conceptual explanation. In practical application, the reference image 410 and the input image 420 may be divided into more regions with smaller block size, such as each region having 10×10 pixels or 20×20 pixels respectively in order to increase the accuracy of compensation. Therefore, the total number of blocks is determined based on the height and width values of the input image 420.

On the other hand, the reliability of compensation value estimation has to be considered. If a difference between the reference image 410 and the input image 420 becomes large due to a lot of foreground objects such that the bias ratio could not dominate the ratio distribution as shown in the FIG. 4d, the reliability of the ratio estimation has to be further inspected. For example, if the occurrence number of quantization index $C_K$ that is with the greatest counts in the histogram does not exceed a reliable ratio of the total number of all blocks, the compensation operation will not be performed to prevent further distortion caused by the compensation. Preferably, the reliable ratio may be predefined as five percent to obtain an acceptable result by experience.

As aforementioned, operations of embodiments of the application are mainly based on the pixel color values. The color characteristic values are processed according to three primary colors, red, green and green colors and thus it is to be understood that each aforementioned characteristic value may include a red characteristic value, a green characteristic value and a blue characteristic value, the aforementioned compensation value may include a red compensation value, a green compensation value and a blue compensation value, the aforementioned ratio values may include a ratio value for red color, a ratio value for green color and a ratio value for blue color, the aforementioned histogram may includes a histogram for red color, a histogram for green color and a histogram for blue color and the compensated image #IN' is obtained by multiplying each red, green and blue color pixel values in the input image #IN by the red compensation value, the green compensation value and the blue compensation value respectively.

Further, the camera may be a black and white camera since the input image 420 only has problem caused by exposure value shifting but does not have problem caused by white balancing. Therefore, the color gain compensation step of the application may be applied to this kind of the image. When calculating the characteristic values of the image blocks, an average grayscale value or the maximum grayscale value of each of the blocks in the input image is calculated and taken as a characteristic value for each block. After the compensation value for grayscale brightness is obtained by the method as stated above for color compensation, the grayscale values of all pixels in the input image are multiplied by the compensation value to obtain a brightness stabilized image #IN'.

Figure 5:
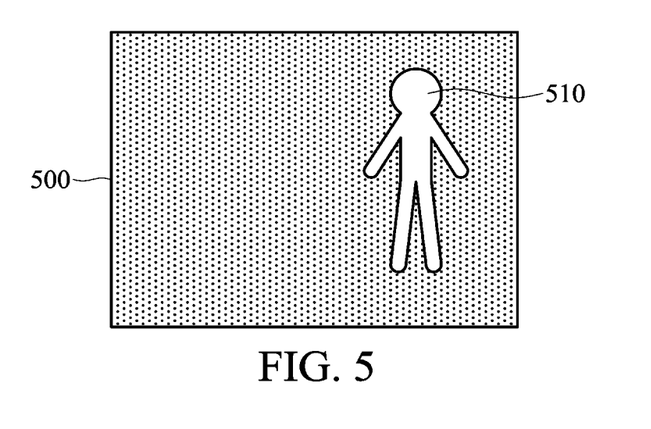
FIG. 5 is a diagram illustrating an embodiment of a background mask generated by the background subtraction algorithm.

FIG. 5 illustrates an embodiment of a background mask generated by the background subtraction algorithm. After the image analyzer 210 outputs a background separation result #BG, the foreground and background regions may be separated in the form of the background mask. A portion that belongs to the background in the background mask 500 are represented by all blacks while a portion that belongs to the foreground 510 in the background mask 500, e.g. a human-like shape, are represented by all whites. As long as the ratio occupied by the whole white portion in the background mask 500 is smaller than a predefined value, the input image #IN that produces the mask is selected as the reference image. In this embodiment, as long as the area occupied by the foreground portion is less than five percent of whole background mask 500, the input image #IN is selected as the reference image.

While the application has been described by way of example and in terms of embodiment, it is to be understood that the application is not limited thereto. Those who are skilled in this technology could still make various alterations and modifications without departing from the scope and spirit of this application. Therefore, the scope of the disclosure embodiment shall be defined and protected by the following claims and their equivalents.

What is claimed is:

1. A foreground image separation method for separating dynamic foreground and static background in continuously inputted images with automatic white balance adjustment and brightness variation, comprising:
   providing a reference image as a basis for color gain compensation;
   receiving an input image from the camera;
   performing a color gain compensation step to the input image according to the reference image to generate a compensated image with color and brightness which are approximately similar to that of at least part of regions of the reference image corresponding to the compensated image; and
   performing a background subtraction algorithm to generate a background separation result,
   wherein the step of providing the reference image further comprises:
      processing the input image with the background subtraction algorithm to generate a background mask;
      calculating a ratio of foreground portions to whole size of the input image; and
      selecting the input image as the reference image if the calculated ratio is less than a predetermined value.

2. The foreground image separation method of claim 1, wherein the camera continuously generates the input image and the color gain compensation step is continuously performed to continuously generate the compensated image.

3. The foreground image separation method of claim 2, wherein the background subtraction algorithm is a Gaussian Mixture Model based algorithm that utilizes the Gaussian Mixture Models as a statistical representation of static background image and thereby a background separation result can be obtained based on the decision of foreground or background for each pixel in the input image.

4. The foreground image separation method of claim 2, wherein the color gain compensation step further comprises:
calculating color characteristics of the reference image and the input image;
comparing the color characteristics of the reference image to that of the input image to generate at least one compensation value; and
multiplying pixel color values of the input image by the compensation value to generate the compensated image.

5. The foreground image separation method of claim 4, wherein the step of calculating color characteristics of the reference image and the input image further comprises:
separately dividing the reference image and the input image into blocks, wherein an amount and a size of each of the blocks in the reference image are same as those in the input image, each block of the reference image having a one-to-one position relationship to one of the blocks of the input image;
calculating a characteristic value of each block according to pixel color value of each block;
dividing the characteristic value of each block in the reference image by the characteristic value of a corresponding block in the input image to obtain a ratio corresponding to each of the blocks; and
performing a distribution analysis of the ratios to obtain the compensation value.

6. The foreground image separation method of claim 5, wherein the step of performing a distribution analysis of the ratios further comprises:
dividing the ratios of all block pairs by a quantization width to obtain a plurality of quantized values and counting the occurrence for each quantized value as a histogram of the ratios; and
selecting a quantized value which is with a greatest occurrence number in the histogram to be the compensation value.

7. The foreground image separation method of claim 6, wherein the step of selecting a quantized value as the compensation value further comprises:
setting the compensation value as one if all of the occurrence numbers of quantized values are not greater than a reliable ratio of a total number of all of the blocks such that the compensated image is equal to the input image.

8. The foreground image separation method of claim 7, wherein the reliable ratio is defined as five percent.

9. The foreground image separation method of claim 6, wherein:
the color characteristic values are processed with three primary colors that are red, green and blue separately such that each of the color characteristic values includes a red characteristic value, a green characteristic value and a blue characteristic value;
the compensation value includes a red compensation value, a green compensation value and a blue compensation value;
the ratio value includes a ratio value for red color, a ratio value for green color and a ratio value for blue color;
the histogram includes a histogram for red color, a histogram for green color and a histogram for blue color; and
the compensated image is obtained by multiplying the red, the green and the blue color pixel values by the red compensation value, the green compensation value and the blue compensation value respectively.

10. The foreground image separation method of claim 9, wherein: the red characteristic value, the green characteristic value and the blue characteristic value of each block is an average value of all of the red color pixel values, an average value of all of the green color pixel values and an average value of all of the blue color pixel values within the block, respectively.

11. The foreground image separation method of claim 9, wherein: the red characteristic value, the green characteristic value and the blue characteristic value of each block is a maximum value of all of the red color pixel values, a maximum value of all of the green color pixel values and a maximum value of all of the blue color pixel values within the block, respectively.

12. The foreground image separation method of claim 1, wherein the predetermined value is defined as five percent.

13. The foreground image separation method of claim 6, wherein:
the reference image and the input image are color images, and brightness characteristic values thereof are obtained by converting color value of each pixel within the reference image and the input image to a grayscale value and calculating characteristic values thereof; and
the compensated image is obtained by multiplying red, green and blue color pixel values of the input image with the compensation value.

14. The foreground image separation method of claim 6, wherein:
the reference image and the input image are grayscale images, and brightness characteristic values thereof are calculated based on a grayscale value of each pixel within the reference image and the input image; and
the compensated image is obtained by multiplying the grayscale value of each pixel within the input image with the compensation value.

* * * * *